(12) United States Patent
Hiramoto et al.

(10) Patent No.: US 8,970,721 B2
(45) Date of Patent: Mar. 3, 2015

(54) IMAGING DEVICE, SOLID-STATE IMAGING ELEMENT, IMAGE GENERATION METHOD, AND PROGRAM

(75) Inventors: Masao Hiramoto, Osaka (JP); Masayuki Misaki, Osaka (JP); Teruyuki Takizawa, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 693 days.

(21) Appl. No.: 13/141,711

(22) PCT Filed: Oct. 1, 2010

(86) PCT No.: PCT/JP2010/005911
§ 371 (c)(1),
(2), (4) Date: Jun. 23, 2011

(87) PCT Pub. No.: WO2011/043045
PCT Pub. Date: Apr. 14, 2011

(65) Prior Publication Data
US 2011/0317053 A1    Dec. 29, 2011

(30) Foreign Application Priority Data
Oct. 7, 2009 (JP) .................. 2009-233286

(51) Int. Cl.
H04N 5/235    (2006.01)
H04N 5/335    (2011.01)
H04N 5/347    (2011.01)
H04N 5/232    (2006.01)
H04N 5/353    (2011.01)
H04N 5/3745   (2011.01)

(52) U.S. Cl.
CPC ........... *H04N 5/347* (2013.01); *H04N 5/23245* (2013.01); *H04N 5/353* (2013.01); *H04N 5/3745* (2013.01)
USPC ........................................ 348/222.1; 348/294

(58) Field of Classification Search
USPC ............ 348/220.1, 222.1, 296, 297, 294, 302
See application file for complete search history.

(56) References Cited

U.S. PATENT DOCUMENTS

| | | | |
|---|---|---|---|
| 6,507,365 B1 * | 1/2003 | Nakamura et al. | 348/296 |
| 6,686,960 B2 * | 2/2004 | Iizuka | 348/273 |
| 7,202,897 B2 * | 4/2007 | Suzuki | 348/296 |
| 7,242,432 B2 * | 7/2007 | Watanabe | 348/333.11 |
| 7,884,868 B2 * | 2/2011 | Kurane | 348/297 |
| 7,944,482 B2 * | 5/2011 | Tani et al. | 348/222.1 |
| 2004/0051798 A1 * | 3/2004 | Kakarala et al. | 348/246 |
| 2005/0100095 A1 * | 5/2005 | Itoh et al. | 375/240.16 |
| 2010/0188358 A1 * | 7/2010 | Kocienda et al. | 345/173 |

\* cited by examiner

*Primary Examiner* — Trung Diep
(74) *Attorney, Agent, or Firm* — Renner, Otto, Boisselle & Sklar, LLP

(57) ABSTRACT

An image capture device includes: an array of pixels 200 including a plurality of pixels 20 which are arranged two-dimensionally on an imaging area; a pixel signal reading section 30 for reading a pixel signal from each pixel 20; and an image generating section 32 for generating an image based on the pixel signals having been read by the pixel signal reading section 30. The array of pixels is divided into M unit pixel blocks 40 (where M is an integer of 2 or more) each containing N pixels (where N is an integer of 2 or more). The pixel signal reading section reads the pixel signals from the N pixels 20 contained in each unit pixel block 40 at every time interval T, with respectively different timings.

12 Claims, 8 Drawing Sheets

IMAGING DEVICE, SOLID-STATE IMAGING ELEMENT, IMAGE GENERATION METHOD, AND PROGRAM

TECHNICAL FIELD

The present invention relates to an imaging technique which utilizes a relationship between spatial resolution and temporal resolution of an image.

BACKGROUND ART

Recent years have seen remarkable improvements in the functionality and performance of digital cameras and digital camcorders utilizing solid-state image sensors such as CCDs or CMOSs (which hereinafter may be referred to as "image sensors"). In particular, the rapid progress in semiconductor fabrication technology is making it possible to miniaturize the pixel structure of solid-state image sensors. As a result, the pixels and driving circuit of solid-state image sensors are enjoying higher degrees of integration, and solid-state image sensors are moving toward more pixels. Especially in the recent few years, the number of pixels in solid-state image sensors has come to exceed several million pixels to 10 million pixels, and solid-state image sensors with tens of millions of pixels have begun to be developed.

Contrary to this trend toward more pixels, there is also a belief that 10 million pixels are not necessary from the standpoint of human visual characteristics. The human retina has cone cells, which sense the color (RGB) of light, and rod cells, which sense brightness and darkness. The number of cone cells and the number of rod cells are said to be about 6.5 million and about 120 million, respectively. This indicates that, from the standpoint of color distinction, the human eye is similar to a color camera with 6.5 million pixels. Moreover, from the standpoint of display devices, it is considered that the number of pixels in current solid-state image sensors is already sufficient. For example, the full high-definition image resolution is 1920×1080, and even higher definition images would only come to a resolution of about 4096×2160. In view of the prevalence of display devices which are capable of displaying such images, the rate of increase in the resolution of display devices is not higher than the rate of increase toward more pixels of solid-state image sensors that are currently under development. In addition, a signal readout time for one image becomes longer in proportion to the number of pixels. Similarly, when images are recoded on a frame-by-frame basis, the amount of data also increases in proportion to the number of pixels.

Specifically, although resolution is in fact improved in cameras in which a solid-state image sensor with a large number of pixels is used, an excessive number of pixels may not be a requirement in view of the human visual perception, display device resolution, signal readout time, and amount of image data to be recorded. Therefore, there is also a notion that resolution may be somewhat sacrificed for attaining improvements in other characteristics.

If it is decided that resolution can be sacrificed, a plurality of pixels may well be regarded as one pixel in the processing. For example, as is disclosed in Patent Document 1, a sum may be taken of signals from a plurality of pixels for enhanced imaging sensitivity. Moreover, by taking a sum of many pixel signals, it becomes possible to cope with low-luminance subjects, such that the dynamic range at a low illuminance can be improved. This produces the same effect as in employing an image sensor having a plurality of pixels with different aperture ratios, which is disclosed in Patent Document 2 and Patent Document 3.

CITATION LIST

Patent Literature

[Patent Document 1] Japanese Laid-Open Patent Publication No. 2001-346103
[Patent Document 2] Japanese Laid-Open Patent Publication No. 4-298175
[Patent Document 3] Japanese Laid-Open Patent Publication No. 2006-174404

SUMMARY OF INVENTION

Technical Problem

In an image capture device in which image sensors with a large number of pixels is used, the amply present pixels may be taken advantage of, and the aforementioned conventional techniques may be used to improve the imaging sensitivity and dynamic range, while sacrificing resolution. However, in some cases, it may not be possible to catch up with the rate of motion video displaying (frame rate) unless a summation process of pixel signals is performed within the image sensor in order to reduce output data. This means that, in the case of shooting a motion video by using an image sensor having a large number of pixels, improved performance such as sensitivity cannot be obtained without sacrificing resolution and without performing a summation process of pixel signals within the image sensor.

In view of the aforementioned problems, the present invention provides a novel imaging technique of generating a motion video at a high frame rate, without having to perform a summation process of pixel signals within the image sensor.

Solution to Problem

An image capture device according to the present invention comprises: an array of pixels including a plurality of pixels which are arranged two-dimensionally on an imaging area, the array of pixels being divided into M unit pixel blocks (where M is an integer of 2 or more) each containing N pixels (where N is an integer of 2 or more); a pixel signal reading section for reading a pixel signal from each pixel at a constant time interval T, and reading the pixel signals from the N pixels contained in each unit pixel block with respectively different timings; and an image generating section for generating an image based on the pixel signals having been read by the pixel signal reading section.

In one embodiment, the pixel signal reading section reads the pixel signals from the N pixels contained in each unit pixel block with timings which respectively differ by a time T/N.

In one embodiment, the image generating section generates the image based on the M×N pixel signals which are read by the pixel signal reading section during the time interval T.

In one embodiment, given a pixel signal $P(i,j)$ which is read by the pixel signal reading section from a $j^{th}$ unit pixel block (where j is an integer of no less than 1 and no more than M) at an $i^{th}$ readout (where i is an integer of N+1 or more), when an absolute value of a difference between $P(i,j)$ and $P(i-1,j)$ is greater than a predetermined value, the image generating section generates the image by adopting $P(i,j)-P(i-N+1,j)\times(N-1)/N$ as a signal representing the pixel value of each pixel in the $j^{th}$ unit pixel block at the $i^{th}$ readout.

In one embodiment, when an absolute value of a difference between P(i,j) and P(i−1,j) is greater than a predetermined value, the image generating section generates the image by adopting P(i+k,j)−P(i+k−1,j)+(k×P(i+k−N,j)−(k−1)×P(i+k−N−1,j))/N (where k is an integer of 1 or more but less than N) as a signal representing the pixel value of each pixel in the $j^{th}$ unit pixel block at an i+$k^{th}$ readout.

In one embodiment, the pixel signal reading section varies the time interval T according to a brightness of a subject.

In one embodiment, the shape of a terrain of each unit pixel block is a cross.

In one embodiment, the image capture device comprises an optical low-pass filter for removing from the image a frequency component higher than a spatial frequency which is defined by the size of the unit pixel block.

In one embodiment, the image generating section performs a low-pass filter process of removing from the image a frequency component higher than a spatial frequency which is defined by the size of the unit pixel block.

A solid-state image sensor according to the present invention comprises: an array of pixels including a plurality of pixels which are arranged two-dimensionally on an imaging area, the array of pixels being divided into M unit pixel blocks (where M is an integer of 2 or more) each containing N pixels (where N is an integer of 2 or more); and a pixel signal reading section for reading a pixel signal from each pixel at a constant time interval T, and reading the pixel signals from the N pixels contained in each unit pixel block with respectively different timings.

A motion video generation method according to the present invention is a method for generating a motion video based on a signal acquired by an image capture device having: an array of pixels including a plurality of pixels which are arranged two-dimensionally on an imaging area, the array of pixels being divided into M unit pixel blocks (where M is an integer of 2 or more) each containing N pixels (where N is an integer of 2 or more); and a pixel signal reading section for reading a pixel signal from each pixel at a constant time interval T, and reading the pixel signals from the N pixels contained in each unit pixel block with respectively different timings, wherein the method comprises: a step of determining whether a difference between two consecutively-read pixel signals in each unit pixel block is greater than a predefined value or not; and a step of, when the difference is greater than the predefined value, generating a motion video with a relatively low resolution and a relatively high frame rate, and when the difference is smaller than the predefined value, generating a motion video with a relatively high resolution and a relatively low frame rate.

A motion video generation program according to the present invention is a program for generating a motion video based on a signal acquired by an image capture device having: an array of pixels including a plurality of pixels which are arranged two-dimensionally on an imaging area, the array of pixels being divided into M unit pixel blocks (where M is an integer of 2 or more) each containing N pixels (where N is an integer of 2 or more); and a pixel signal reading section for reading a pixel signal from each pixel at a constant time interval T, and reading the pixel signals from the N pixels contained in each unit pixel block with respectively different timings, wherein the program comprises: a step of determining whether a difference between two consecutively-read pixel signals in each unit pixel block is greater than a predefined value or not; and a step of, when the difference is greater than the predefined value, generating a motion video with a relatively low resolution and a relatively high frame rate, and when the difference is smaller than the predefined value, generating a motion video with a relatively high resolution and a relatively low frame rate.

Advantageous Effects of Invention

With an image capture device and solid-state image sensor according to the present invention, it is possible to generate a motion video at a high frame rate, without having to perform a summation process of pixel signals within the image sensor. Furthermore, according to one embodiment of the present invention, images with a high resolution and a high light utility rate can be generated in the case where the subject is motionless, and a motion video with a low resolution and a high frame rate can be generated in the case where the subject has some motion.

DESCRIPTION OF EMBODIMENTS

Prior to describing preferred embodiments of the present invention, fundamental principles of the present invention will be briefly described first.

Figure 1:
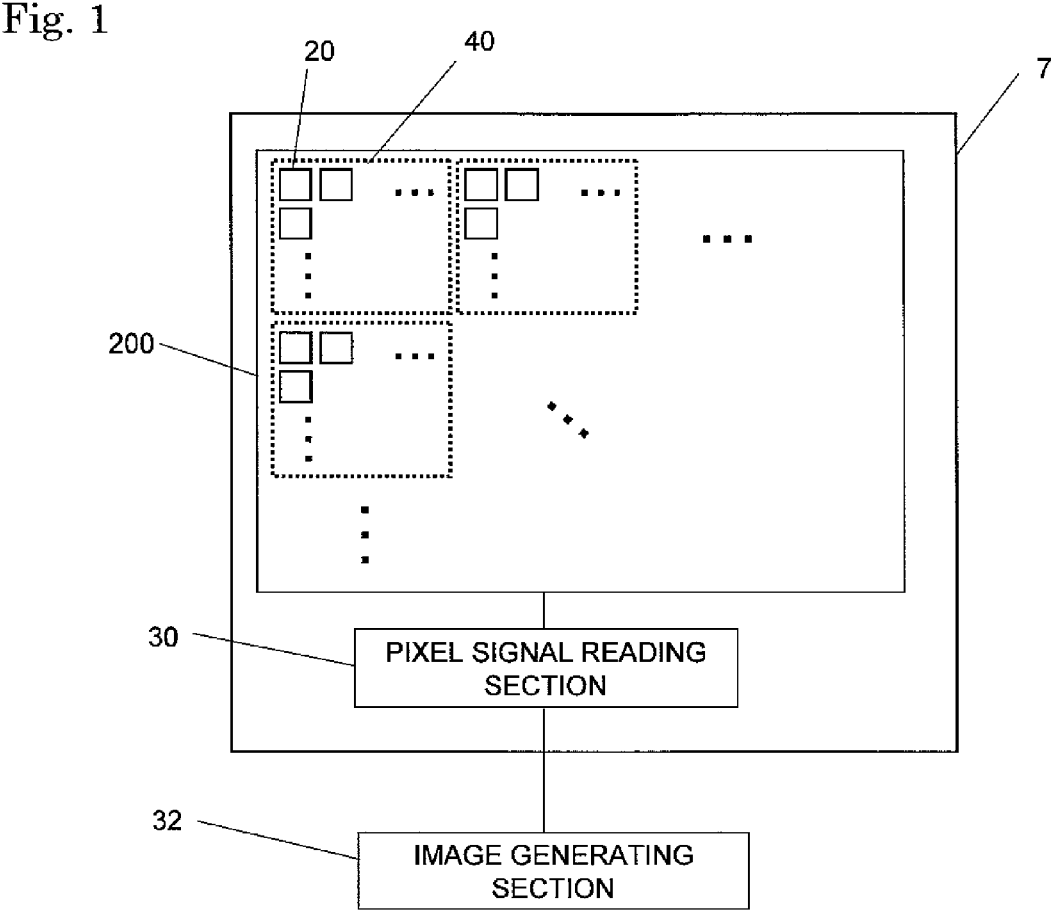
[FIG. 1] A block diagram showing an exemplary fundamental construction of an image capture device according to the present invention

FIG. 1 is a block diagram showing an exemplary schematic construction of an image capture device according to the present invention. The image capture device includes: an array of pixels 200 including a plurality of pixels 20 arranged two-dimensionally on an imaging area; a pixel signal reading section 30 for reading a pixel signal from each pixel; and an image generating section 32. Although the array of pixels 200 and the pixel signal reading section 30 are included in the solid-state image sensor 7 in the example shown in the figure, a portion of the image signal reading section 30 may be provided outside the solid-state image sensor 7.

The array of pixels 200 is divided into a plurality of unit pixel blocks 40, such that each unit pixel block 40 includes a plurality of pixels 20. In the present specification, it is assumed that the number of unit pixel blocks 40 included in the array of pixels 200 is M (where M is an integer of 2 or more), and that the number of pixels 20 included in each unit pixel block 40 is N (where N is an integer of 2 or more). In other words, the array of pixels 200 includes M×N pixels 20. Each pixel 20 receives light which enters during exposure, and outputs a photoelectric-converted signal (pixel signal) which is in accordance with the amount of received light (received light amount). Among the pixels 20 included in the array of pixels 200, the number of pixels which are used for image generation is M×N; however, the array of pixels 200 may also include pixels which are not used for image generation.

The pixel signal reading section 30 reads a pixel signal from each pixel 20 at a constant time interval T. However, rather than reading pixel signals from all of the pixels 20 with the same timing, the pixel signals are read with respectively different timings from the N pixels in each unit pixel block 40.

Figure 2:
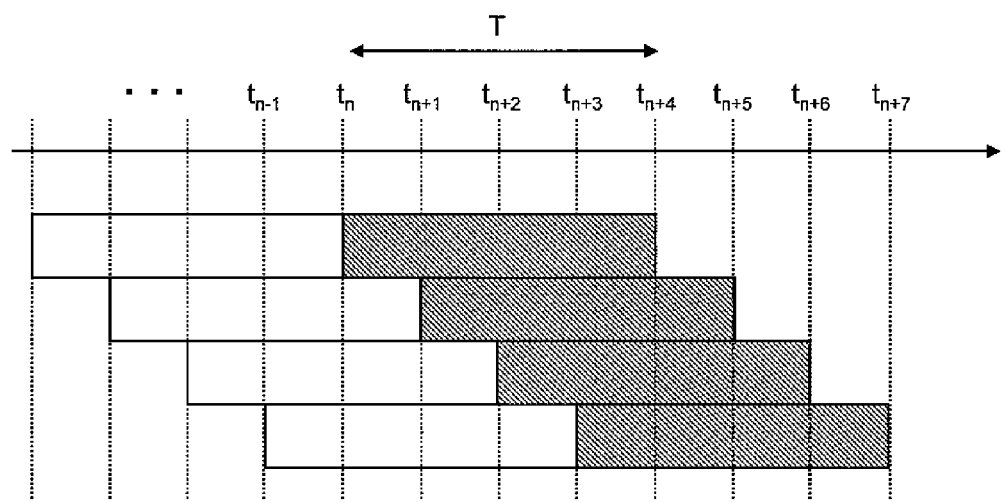
[FIG. 2] A diagram showing examples of signal storing periods of respective pixels of an image capture device according to the present invention

FIG. 2 is a diagram showing signal storing periods of respective pixels 20 included in one unit pixel block 40. In FIG. 2, it is assumed as an example that four pixels 20 are included in one unit pixel block 40 (N=4), such that the timings of reading pixel signals from the respective pixels are at an equal interval (every T/4). However, the present invention is not limited to such an example, and the timings of reading from the respective pixels do not need to be at an equal interval. In the first pixel, a pixel signal begins to be accumulated at time $t_n$, and the pixel signal is read at time $t_{n+4}$. In the second pixel, a pixel signal begins to be accumulated at time $t_{n+1}$, and the pixel signal is read at time $t_{n+5}$. In the third pixel, a pixel signal begins to be accumulated at time $t_{n+2}$, and the pixel signal is read at time $t_{n+6}$. In the fourth pixel, a pixel signal begins to be accumulated at time $t_{n+3}$, and the pixel signal is read at time $t_{n+7}$. Herein, $T=t_{n+4}-t_n=t_{n+5}-t_{n+1}=t_{n+6}-t_{n+2}=t_{n+6}-t_{n+3}$. In each pixel 20, once a pixel signal has been read, the accumulated signal is reset, and storage of another signal begins. Thereafter, a pixel signal is read from each pixel at every time interval T.

Since the pixel signal reading section 30 reads pixel signals from the respective pixels 20 with the aforementioned timings, N pixel signals are obtained at every time T, whose storing periods are shifted by T/N each. From the total of M×N pixel signals, N of which are obtained from each unit pixel block 40 over the course of time T, the image generating section 32 is able to generate one image. By setting a sufficiently long time interval T depending on the brightness of the subject, it is ensured that a sufficient light amount is retained in this image. Moreover, since the image is generated based on pixel signals that are read from the respective pixels 20, a high resolution image is obtained. Thus, according to the present invention, a high resolution and high sensitivity image (still image) can be obtained.

Furthermore, since the timing of reading a pixel signal differs from pixel to pixel, the image generating section 32 is able to calculate a signal amount that is accumulated between two consecutive points of readout, through calculations using the pixel signals which are read in one unit pixel block 40. The details of the calculation process will be described later. By adopting this signal amount as the pixel value for every pixel that is included in the unit pixel block, a motion video with a higher frame rate than a frame rate which is defined by the time interval T can be generated, although the resolution will be lower. By setting the time interval T at a usual frame interval that is used in motion video generation, a motion video with a higher frame rate than usual can be generated.

Furthermore, by comparing the respective pixel signals, the image generating section 32 is able to detect the presence or absence of motion of a subject. Hereinafter, an exemplary process in the case where the imaging scheme is changed depending on the presence or absence of motion of a subject will be described. First, the image generating section 32 performs a difference calculation between two consecutively-read pixel signals in each unit pixel block 40, and detects the presence or absence of motion of the subject based on whether the difference is greater than a predefined value or not. If it is determined that the subject is not moving, the image generating section 32 generates an image with the aforementioned method of acquiring a still image. In this case, a motion video is generated with a frame rate which is defined by the time interval T. If it is determined that the subject is moving, the image generating section 32 generates an image by adopting a signal which is obtained through the aforementioned calculation between the two pixel signals as a pixel signal of each pixel in that unit pixel block 40. By performing similar signal calculations thereafter in accordance with the readout timings of the pixel signals, a motion video with a higher frame rate than in the case of determining that the subject is not moving is generated, although the resolution will be lower. The details of the motion video generation method by the image generating section 32 will be described later.

By performing the above processes, it becomes possible to perform a high-resolution and high-sensitivity shooting in the case where the motion of the subject is small, or perform a motion video shooting with a relatively high frame rate, although the resolution will be lower, in the case where the motion of the subject is large.

Hereinafter, embodiments of the present invention will be described with reference to FIGS. 3 to 10B. In the following descriptions, like reference numerals will be used for like elements, throughout a number of figures.

Embodiment 1

Figure 3:
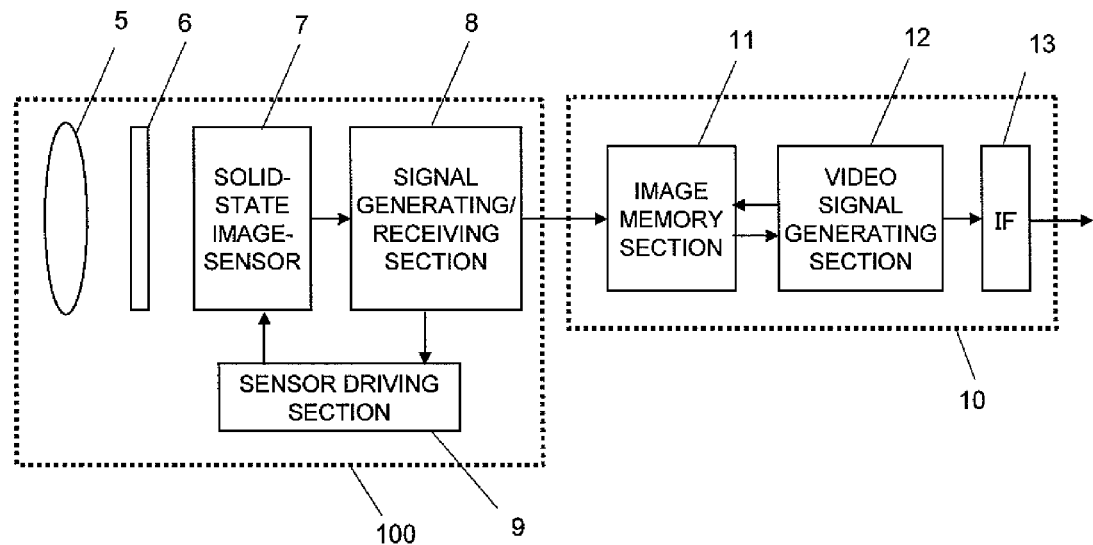
[FIG. 3] A block diagram showing a schematic construction of an image capture device according to Embodiment 1 of the present invention

FIG. 3 is a block diagram showing an overall construction of an image capture device according to a first embodiment of the present invention. The image capture device of the present embodiment, which is a digital-type camcorder, includes an imaging section 100 and a video signal processing section 10 for generating an image signal (video signal) based on a signal which is sent from the imaging section 100.

The imaging section 100 includes a converging lens 5 for converging an image of a subject, an optical filter 6, and a solid-state image sensor 7 (image sensor) for converting optical information which has been converged through the converging lens 5 and the optical filter 6 into an electrical signal via photoelectric conversion. The imaging section 100 further includes a signal generating/receiving section 8 which generates a basic signal for driving the solid-state image sensor 7 and which receives an output signal from the solid-state image sensor 7 and sends it to the video signal processing section 10, and a sensor driving section 9 for driving the image sensor 7 based on the basic signal generated by the signal generating/receiving section 8. Note that the sensor driving section 9 may be incorporated in the signal generating/receiving section 8.

The converging lens 5 is a known lens, and may be a lens unit having a plurality of lenses. The optical filter 6 includes, in a crystal low-pass filter for alleviating a moiré pattern that occurs due to pixel arrangement, an infrared cutoff filter for removing infrared. The image sensor 7 is typically a CMOS sensor, and is produced by a known semiconductor fabrication technique. The signal generating/receiving section 8 and the sensor driving section 9 are composed of an LSI.

The video signal processing section 10 includes a video signal generating section 12 for processing a signal which is sent from the imaging section 100 to generate a video signal, an image memory section 11 for storing various data that are generated during the generation of the video signal, and a video interface section 13 for sending out the generated video signal to the exterior. The video signal generating section 12 can be suitably implemented as a combination of hardware such as a known digital signal processor (DSP) and software for executing the image processing, including the video signal generation process. In the present embodiment, the video signal generating section 12 and the image memory section 11 are included in the image generating section 32 according to the present invention. The image memory section 11 is composed of a DRAM or the like. The image memory section 11 records a signal which is sent from the imaging section 100, and temporarily records the image data that is generated by the video signal generating section 12, as well as compressed image data. Via the video interface section 13, such image data are sent to a storage medium, a display section, and the like not shown.

Although the image capture device of the present embodiment may include known constituent elements such as an electronic shutter, a viewfinder, a power source (battery), and a flashlight, the descriptions thereof are omitted because they are not essential to the understanding of the present invention. Moreover, the above construction is only exemplary; as for those constituent elements which are not related to the read operation of pixel signals in the solid-state image sensor 7, known elements may be employed in any suitable combination in the present invention.

Figure 4:
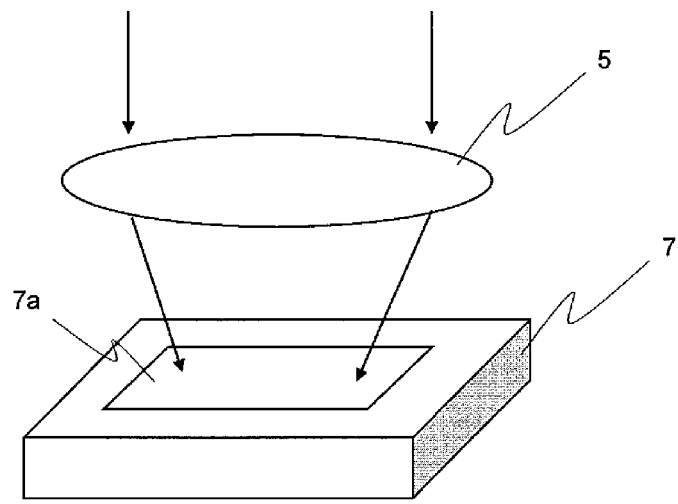
[FIG. 4] A schematic diagram showing positioning of a lens and an image capture device according to Embodiment 1 of the present invention

FIG. 4 is a diagram schematically showing how light transmitted through the converging lens 5 may enter the image sensor 7 during exposure. In FIG. 4, for simplicity, any constituent elements other than the converging lens 5 and the image sensor 7 are omitted from illustration. Although the lens 5 may generally be composed of a plurality of lenses arranged along the optical axis direction, it is illustrated as a single lens for simplicity. On an imaging area 7a of the image sensor 7 is provided an array of pixels including a plurality of pixels which are arranged two-dimensionally. Each pixel is typically an electronic circuit including a photodiode which, through photoelectric conversion, outputs a pixel signal that is in accordance with the incident light amount. Light (visible light) having been transmitted through the converging lens 5 and the optical filter 6 strikes the imaging area 7a.

Figure 5A:
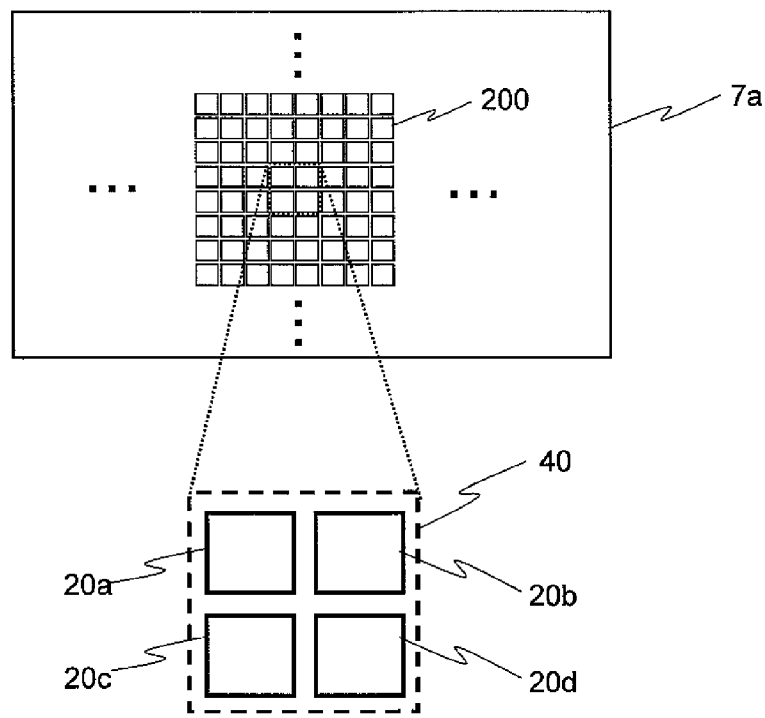
[FIG. 5A] A diagram showing an exemplary pixel arrangement according to Embodiment 1 of the present invention
Figure 5B:
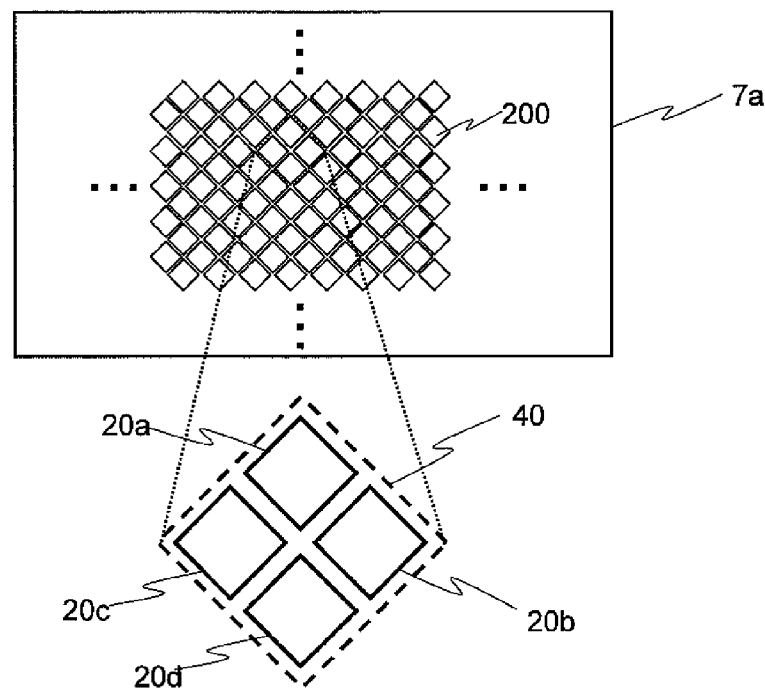
[FIG. 5B] A diagram showing another exemplary pixel arrangement according to Embodiment 1 of the present invention

FIG. 5A is a plan view showing a pixel arrangement in the present embodiment. As shown in FIG. 5A, the array of pixels 200 includes a plurality of pixels which are arrayed in a square lattice on the imaging area 7a. The array of pixels 200 is divided into a plurality of unit pixel blocks 40, such that each unit pixel block 40 includes four pixels 20a, 20b, 20c, and 20d which are arranged in two rows by two columns. Note that the pixel arrangement may not be such a square lattice array, but may be an oblique lattice array as shown in FIG. 5B, for example, or any other array.

Hereinafter, with reference to FIGS. 6 to 9, the processing, storing periods, and reading method of pixel signals will be described.

Figure 6:
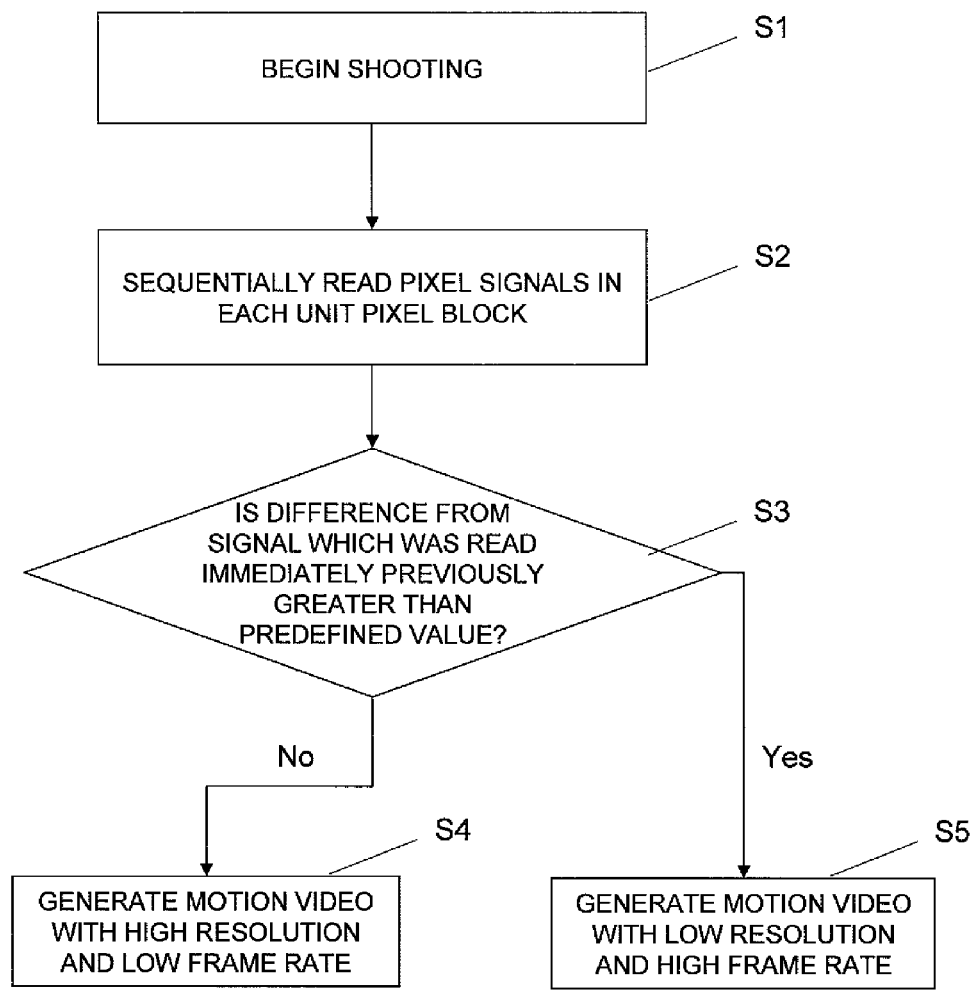
[FIG. 6] A flowchart showing an image generation method according to Embodiment 1 of the present invention

FIG. 6 is a flowchart showing a schematic procedure for generating a motion video with the image capture device of the present embodiment. When shooting is begun, a charge which is in accordance with the incident light amount is accumulated in each pixel (S1). Next, for each unit pixel block, pixel signals are sequentially read, pixel by pixel, with a constant time interval T (S2). For each unit pixel block, it is determined whether the difference between a pixel signal which has just been read and a pixel signal which was read immediately previously is greater than a predefined value or not (S3). When the difference is equal to or less than the predefined value, it is determined that the subject is not moving, and an image is generated by adopting the intact pixel signal value of each pixel as the pixel value of that pixel. In this manner, an image is generated at every time interval T. As a result, a motion video with a high resolution and a low frame rate is generated (S4). On the other hand, if the difference is greater than the predefined value, it is determined that the subject is moving, and through a process described later, a motion video with a low resolution and a high frame rate is generated (S5).

Hereinafter, a reading method for pixel signals according to the present embodiment will be described.

Figure 7:
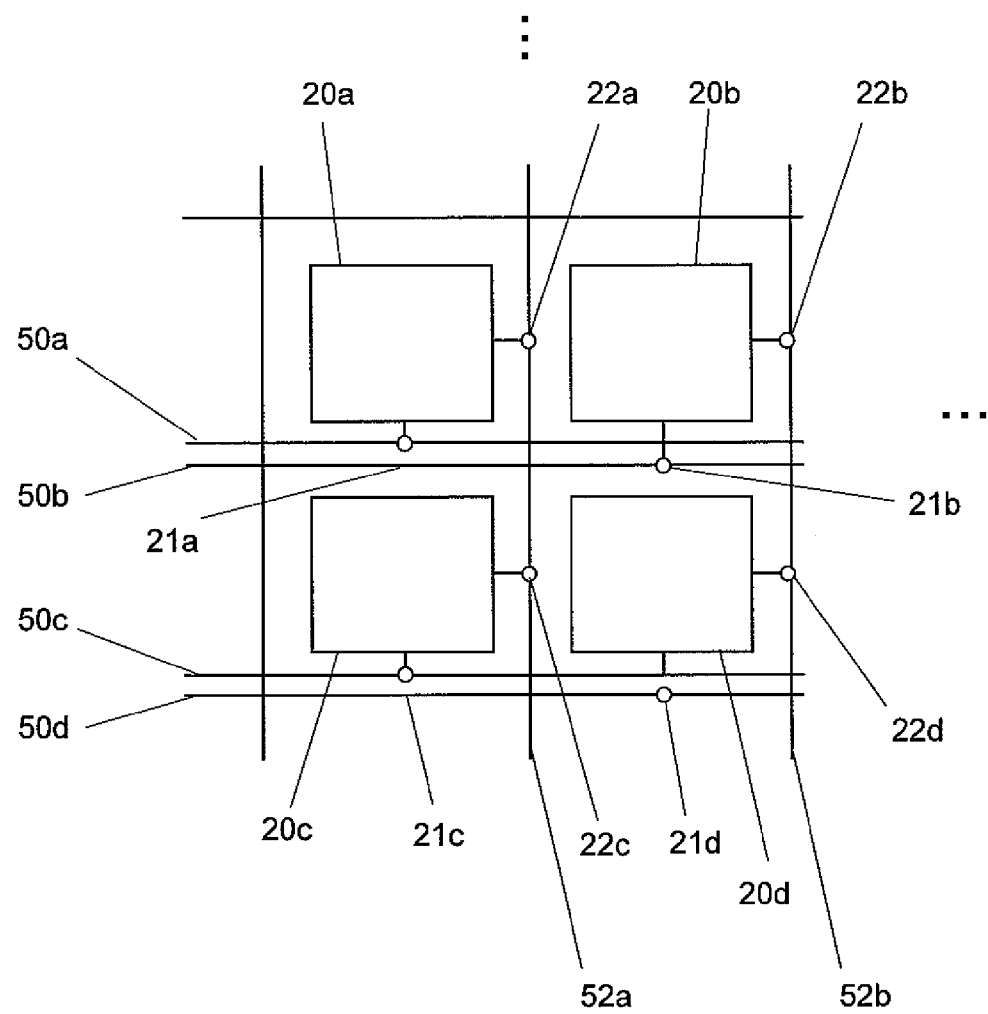
[FIG. 7] A diagram showing a unit pixel block, read signal lines, and output signal lines according to Embodiment 1 of the present invention

FIG. 7 is a diagram schematically showing read signal lines 50a, 50b, 50c, and 50d which are connected to four pixels 20a, 20b, 20c, and 20d that are contained in one unit pixel block 40, as well as output signal lines 52a and 52b. Readout signals are generated by the sensor driving section 9, and supplied to the pixels 20a, 20b, 20c, and 20d via input terminals 21a, 21b, 21c, and 21d, respectively. When a read signal is supplied to each pixel, the pixel outputs a pixel signal which is in accordance with the accumulated charge amount. The pixel signals which are output from the pixels 20a and 20c are supplied to the output signal line 52a via the output terminals 22a and 22c, respectively. The pixel signals which are output from the pixels 20b and 20d are supplied to the output signal line 52b via the output terminals 22b and 22d, respectively. In the present embodiment, the read signal lines 50a to 50d and the output signal lines 52a and 52b function as portions of the signal reading section 30 according to the present invention. The construction of the read signal lines and the output signal lines is not limited to the construction shown in FIG. 7, but may be any construction that permits reading of the pixel signals as described later.

The read signals are supplied from the sensor driving section 9 to all pixels at a constant time interval T. Herein, the input timing is shifted from pixel to pixel by every T/4. In other words, if a read signal is supplied to the pixel 20a at time $t_n$, a read signal is supplied to the pixel 20b at time $t_{n+1}=t_n+T/4$, a read signal is supplied to the pixel 20c at time $t_{n+2}=t_n+2T/4$, and a read signal is supplied to the pixel 20b at time $t_{n+3}=t_n+3T/4$. Thereafter, read signals will be supplied to the respective pixels at every time interval T.

Figure 8:
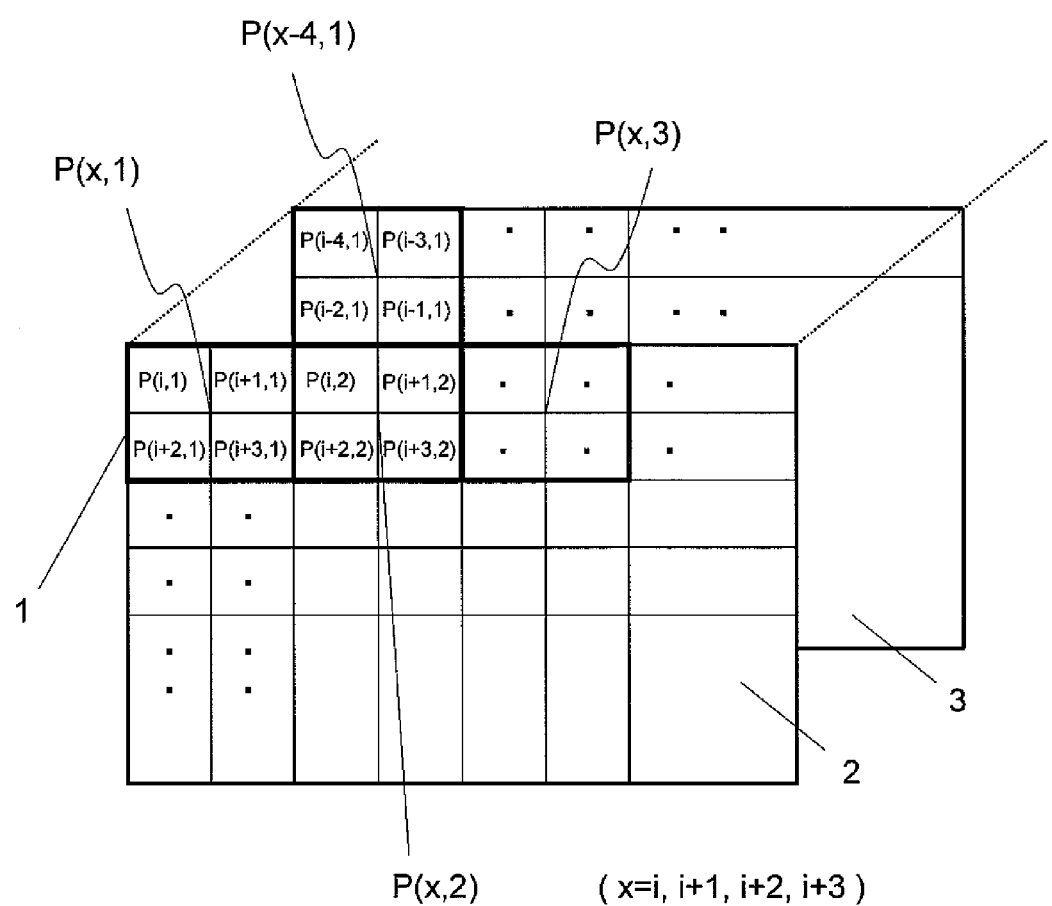
[FIG. 8] A diagram showing signals at respective pixels of a solid-state image sensor according to Embodiment 1 of the present invention

FIG. 8 is a diagram schematically showing two consecutive frames among images which are generated by adopting the intact pixel signals which are output from the respective pixels of the solid-state image sensor 7 of the present embodiment every time T as the pixel values of the respective pixels. An image 3 represents an image which is one frame before an image 2. Herein, numeral P(i,1), etc., that is shown in each pixel of the images represents the pixel value of that pixel. In FIG. 8, a unit pixel block 1 consisting of four pixels (P(i,1), P(i+1,1), P(i+2,1), P(i+3,1)) in the upper left end of the image 2 is denoted as P(x,1). Herein, x=i, i+1, i+2, i+3. When the imaging is directed to a motion video, these four pixels are to be regarded as one pixel. Herein, subscript j in a pixel signal P(i,j) is the number of a unit pixel block in one entire image, whose numerical value does not change over time. On the other hand, subscript i is the number representing an order of reading the pixels within the unit pixel block, whose numerical value keeps changing over time. For example, in the unit pixel block 1, the signals P(i−4,1), P(i−3,1), P(i−2,1), and P(i−1,1) are to be sequentially read from the first to fourth pixels, respectively, each being shifted by a time interval T/4. Thereafter, the signal P(i,1), signal P(i+1,1), signal P(i+2,1), and signal P(i+3,1) are to be sequentially read again from the first to fourth pixels, respectively, each being shifted by the time interval T/4.

As for subscript j, assuming that the unit pixel block 1 in the upper left end in FIG. 8 is j=1, its numerical value is increased in the column direction (the direction from the left side toward the right side), and when the right end is reached, numbering is repetitively continued in the row direction (the upper to lower direction in FIG. 7), in the present embodiment. As for subscript i, assuming that the pixel at the upper left end that is contained in each unit pixel block has a number i, then the number of the pixel at the upper right end is i+1, the number of the pixel at the lower left end is i+2, and the number of the pixel at the lower right end is i+3. Therefore, a pixel signal P(i,1) at the upper left end of the entire image is expressed as P(i−4,1) in one frame before, and P(i+4,1) in one frame after.

Figure 9:
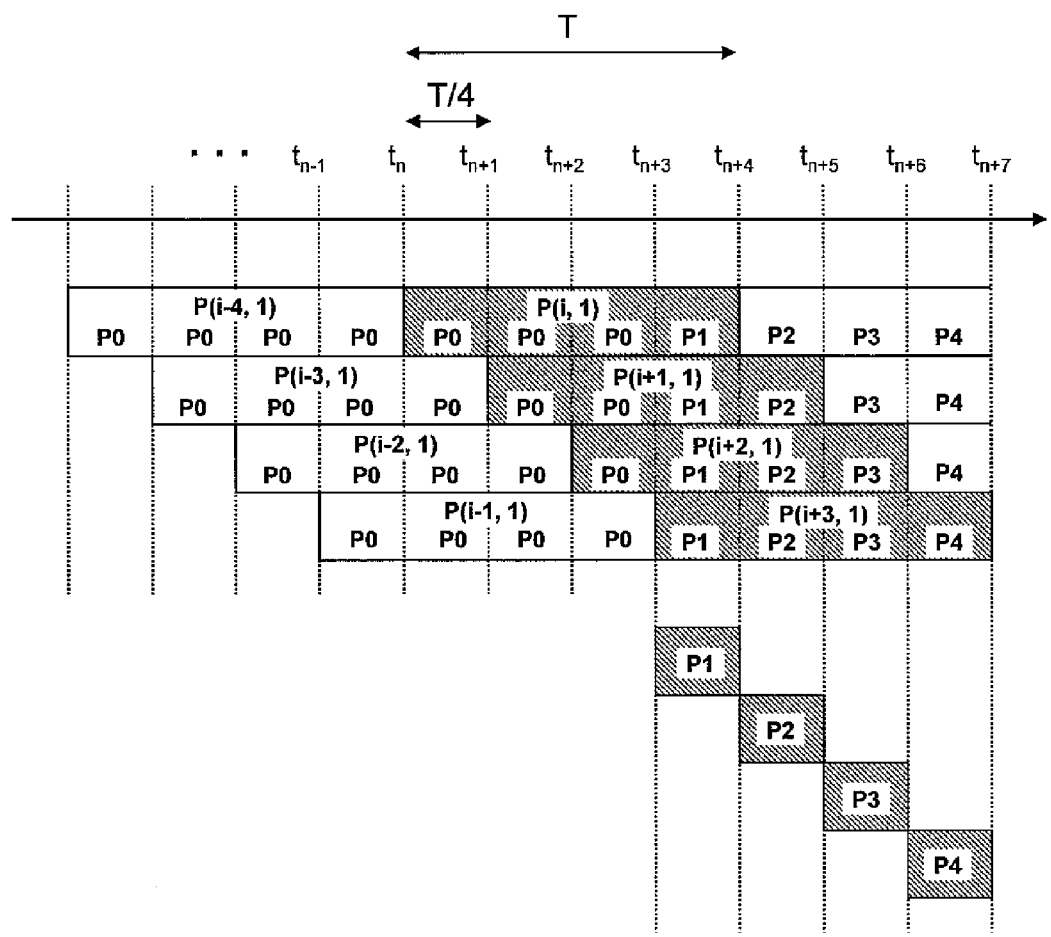
[FIG. 9] A timing diagram showing timing of signal readout in one unit pixel block of a solid-state image sensor according to Embodiment 1 of the present invention

FIG. 9 is a timing diagram showing an exemplary timing of signal readout for each pixel in the unit pixel block 1 at the upper left end of the array of pixels 200 of the solid-state image sensor 7 of the present embodiment. Assuming that the points of readout for the pixels when generating a motion video with a usual frame rate are $t_n$, $t_{n+1}$, $t_{n+2}$, . . . , then, according to the present embodiment, the signal storing period $T(=t_{n+4}-t_n)$ for one pixel is four times as long as the usual storing period. By doing this, multiple storage of information from a plurality of frames becomes possible. Although such signal storage is to be performed similarly in any pixel, the timing of beginning signal storage and the timing of reading an accumulated pixel signal differs depending on the pixel in the unit pixel block. Although the signal storing period T is set to four times as long as the usual storing period in the present embodiment, the signal storing period T may be set to any arbitrary value in the present invention. Preferably, an optimum time suited to the brightness of the subject is set as the signal storing period T.

In the example of FIG. 9, the pixel signal P(i,1) is accumulated in the pixel at the upper left end of the image from time $t_n$, and read at time $t_{n+4}$. The pixel signal P(i+1,1) is accumulated in the next pixel on the right of the upper-left-end pixel from time $t_{n+1}$, and read at time $t_{n+5}$. Similarly for the other two pixels, the timing of signal storage is shifted by T/4 $(=t_{n+1}-t_n)$ each, and the timing of read is also shifted by the same amount of time.

With the above construction, optical information which is converged by the converging lens 5 is subjected to photoelectric conversion by the solid-state image sensor 7, thereafter read by the signal generating/receiving section 8, and accumulated in the image memory section 11. In each unit pixel block, since the point of readout is shifted by every T/4 for each pixel, an amount of time $T(=t_{n+4}-t_n)$ is required before one frame of image data becomes ready. When one frame of data has become ready at the image memory section 11, the image data is sent to the video signal generating section 12. Based on the image data sent, the video signal generating section 12 generates a video signal, and the generated video signal is sent to the exterior via the video interface section 13.

Next, the signal processing at the video signal generating section 12 will be described. Data of one image is accumulated in the image memory section 11, and then the data is sent to the video signal generating section 12, after which signal processing is performed on an image frame-by-image-frame basis. The signal processing is performed on a frame-by-frame basis, and is performed concurrently for the respective unit pixel blocks. In the following description, the signal processing which is performed in the unit pixel block 1 at the upper left end of an image will be described as an example.

For every unit pixel block, each pixel signal is compared against the data of a pixel signal which was read immediately previously, and if every such difference is smaller than a predetermined value Zth, the value of each pixel signal is adopted as the pixel value of that pixel, and thus a video signal of one image is generated. In other words, the image is determined as being still, and an output is made only once in four steps (one image in time T), but the sensitivity is improved to four times the usual level, and yet an image is generated with no deterioration in resolution. Therefore, in this case, a motion video with a frame rate which is ¼ times the usual frame rate is generated.

On the other hand, as a result of comparison against the data of an immediately-previously-read pixel signal in every unit pixel block, even if one such difference is greater than the predetermined value Zth, then it is determined that the subject has some motion. In this case, an image is generated on a frame-by-frame basis through the following process. Herein, an example will be considered where a change in the pixel value occurs from time $t_{n+3}$ to $t_{n+4}$ in the pixel signal P(i,1). Specifically, as shown in FIG. 9, it is assumed that, up to time $t_{n+3}$, a signal with an amount of P0 is accumulated in each pixel per time T/4. It is further assumed that a signal of an amount of P1 from time $t_{n+3}$ to $t_{n+4}$; P2 from time $t_{n+4}$ to $t_{n+5}$; P3 from time $t_{n+5}$ to $t_{n+6}$; or P4 from time $t_{n+6}$ to $t_{n+7}$ is accumulated in each pixel. The premise herein is that the pixel signals are identical throughout one unit pixel block. Based on this premise, it can be determined that a still state exists up to the pixel signal P(i−1,1), which is one before P(i,1) is read. P(i,1) is a signal which was accumulated from time $t_n$ to $t_{n+4}$, and P(i−1,1) is a signal which was accumulated from time $t_{n-1}$ to $t_{n+3}$, and therefore the signal P1 which was accumulated from time $t_{n+3}$ to $t_{n+4}$ can be obtained from eq. 1 below.

$$P1=P(i,1)-P(i-1,1)\times 3/4 \quad\text{(eq. 1)}$$

From a similar process, the signal P2 from time $t_{n+4}$ to $t_{n+5}$, the signal P3 from time $t_{n+5}$ to $t_{n+6}$, and the signal P4 from time $t_{n+6}$ to $t_{n+7}$ can be respectively obtained from eqs. 2 to 4 below.

$$P2=P(i+1,1)-P(i,1)+P(i-3,1)/4 \quad\text{(eq. 2)}$$

$$P3=P(i+2,1)-P(i+1,1)+(2P(i-2,1)-P(i-3,1))/4 \quad\text{(eq. 3)}$$

$$P4=P(i+3,1)-P(i+2,1)+(3P(i-1,1)-2P(i-2,1))/4 \quad\text{(eq. 4)}$$

As a result, by adopting the above signals P1 to P4 as the pixel values within the unit pixel block 1, pixel values are obtained from frame to frame, although the resolution will be lower. The signals at time $t_{n+7}$ and after can also be obtained through a similar calculation to eq. 6. The above process is similarly performed for the other unit pixel blocks as well. As a result, a motion video with the usual frame rate is generated, although the resolution will be lower.

Note that the signals P3 and P4 may be obtained through calculations shown in eqs. 5 and 6, instead of eqs. 3 and 4 above.

$$P3=P(i+2,1)-P(i+1,1)+P(i-2,1)/4 \quad\text{(eq. 5)}$$

$$P4=P(i+3,1)-P(i+2,1)+P(i-1,1)/4 \quad\text{(eq. 6)}$$

In the above description, comparison against a pixel signal which was read immediately previously is performed with respect to every unit pixel block, and the determination as to whether the subject is moving or not is made based on whether the difference is greater than a predefined value or not. However, the determination may be made by other methods. For example, the aforementioned determination may be applied to each unit pixel block, and only the portion(s) where some image motion exists may be granted a motion video with a low resolution and a relatively high frame rate. Moreover, detection of the presence or absence of motion of the subject may be made based on a comparison against a pixel signal from one frame before, rather than an immediately previous pixel signal.

If it is determined that the subject is motionless, it may be ensured that no new image is generated until the subject is determined as having some motion. Furthermore, once an image is generated, the determination as to whether the subject has some motion may be stayed for a while, and may be resumed after the lapse of a predetermined time (e.g., several seconds).

Thus, according to the present embodiment, by dividing the array of pixels of the solid-state image sensor 7 into a plurality of unit pixel blocks, assigning a storing period which is longer than usual for each pixel in each unit pixel block, and varying the timing of storage, multiple images pertaining to different times are obtained. As a result, if the subject is motionless, a motion video with a relatively high light utility rate and a low frame rate is obtained. If the subject has some motion, through calculations based on eq. 1 to eq. 4, a motion video is obtained with a relatively high frame rate, although the resolution will be lower. Thus, according to the present invention, an excellent effect is provided in that the imaging scheme can be changed depending on the presence or absence of motion of the subject, which is not conventionally attained.

In the present embodiment, when it is determined that the subject has some motion, no processing is performed for the pixel signals up to $P(i-1,1)$ that have been read, based on the assumption that the pixel signal is identical throughout the unit pixel block. However, an average pixel value Pm may be calculated through a calculation expressed by eq. 7 below, and Pm may be used in the subsequent processes as an image signal from time $t_{n-1}$ to $t_{n+3}$.

$$Pm=(P(i-4,1)+P(i-3,1)+P(i-2,1)+P(i-1,1))/4 \quad \text{(eq. 7)}$$

Although it was illustrated that the unit pixel block consists of four pixels that are arranged in two rows by two columns, this is not a limitation. Any plural number of pixels may be included in the unit pixel block.

In the case where the number of pixels included in each unit block is N (where N is an integer of 2 or more), the image capture device of the present embodiment is generalizable as follows. First, assuming that the number of unit pixel blocks is M, the sensor driving section 9 generates read signals so that pixel signals will be read from the N pixels included in each unit pixel block with timings which respectively differ by a time T/N. Next, the signal generating/receiving section 8 sequentially reads pixel signals from these pixels with timings which respectively differ by the time T/N. Herein, a pixel signal which is read from a $j^{th}$ unit pixel block (where j is an integer of no less than 1 and no more than M) at an $i^{th}$ readout (where i is an integer of N+1 or more) is designated $P(i,j)$. If the absolute value of the difference between $P(i,j)$ and $P(i-1,j)$ is equal to or less than a predetermined value Zth, the video signal generating section 12 determines that the subject is still. Then, one image is generated based on the M×N pixel signals which were accumulated in the respective pixels during the time T. On the other hand, if the absolute value of the difference between $P(i,j)$ and $P(i-1,j)$ is greater than the predetermined value Zth, it is determined that the subject is moving. Then, a signal Pij expressed by eq. 8 below is processed as a signal representing the pixel value of each pixel at the $i^{th}$ readout in the $j^{th}$ unit pixel block.

$$Pij=P(i,j)-P(i-N+1,j)\times(N-1)/N \quad \text{(eq. 8)}$$

Furthermore, a signal Pijk expressed by eq. 9 below is processed as a signal representing the pixel value of each pixel at the i+k$^{th}$ readout (where k is an integer of 1 or more but less than N) in the $j^{th}$ unit pixel block.

$$Pijk=P(i+k,j)-P(i+k-1,j)+(k\times P(i+k-N,j)-(k-1)\times P(i+k-N-1,j))/N \quad \text{(eq. 9)}$$

Through the above processes, in the case where the number of pixels included in each unit pixel block is N, too, an appropriate imaging method is selected based on the motion of the subject, whereby a high-quality motion video can be generated.

Although the image capture device of the present embodiment has a function of dynamically changing the imaging scheme by detecting the presence or absence of motion of a subject during the shooting of a motion video, such a function is not a requirement in the present invention. For example, there may only be a function of generating a motion video with a scheme which is to be executed when it is determined that the subject has some motion in the above description. Alternatively, there may only be a function of generating a still image through a process which is to be performed when it is determined that the subject is not moving in the above description.

The present embodiment is based on the premise that a substantially equal amount of light strikes each pixel included in each unit pixel block 40. This can be realized by using an optical low-pass filter that is included in the optical filter 6 to remove the image component of any frequency that is higher than a spatial frequency which is defined by the size of each pixel block 40. However, without incorporating an optical low-pass filter, the image capture device can attain similar effects by performing a low-pass filter process for removing high frequency components of the image based on the pixel signals having been read.

The signal calculation process in the present embodiment is executed by the video generating section 12. However, the image capture device does not need to be arranged so as to perform the signal calculation process. For example, the image capture device may only perform generation of pixel signals, while reading of pixel signals and generation of a video signal may be performed by an external information processing device. This can be realized by allowing a program that defines the signal calculation process of the present embodiment to be executed by that information processing device, for example.

Embodiment 2

Figure 10A:
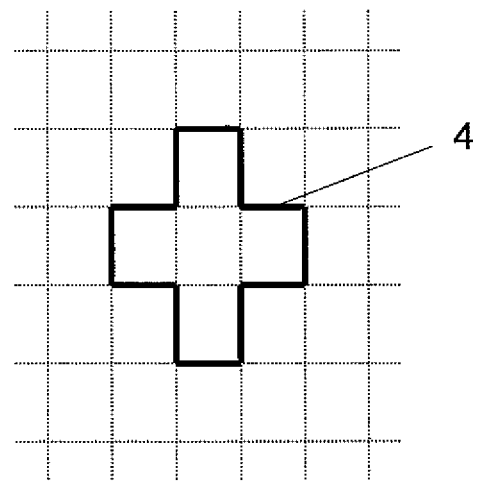
[FIG. 10A] A plan view showing a unit pixel block according to Embodiment 2 of the present invention
Figure 10B:
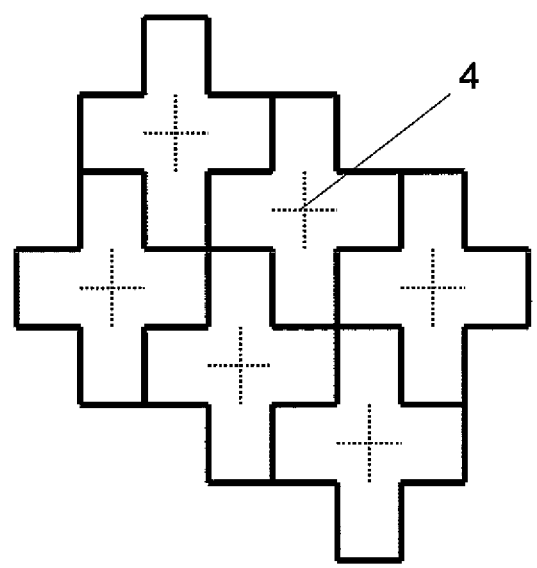
[FIG. 10B] A plan view showing relative positioning of a plurality of adjoining unit pixel blocks according to Embodiment 2 of the present invention

Next, a second embodiment of the present invention will be described with reference to the figures. FIGS. 10A and 10B show a unit pixel block according to the present embodiment. FIG. 10A shows one unit pixel block 4, and FIG. 10B is a pixel plan view showing a plurality of unit pixel blocks 4 adjoining each other. The only differences between the present embodiment and Embodiment 1 are the number of pixels included in the unit pixel block and the shape of the terrain of the unit pixel block, while the image capture device construction and signal processing are entirely identical. Therefore, only the differences from Embodiment 1 will be described in the following description.

As shown in FIG. 10A, the unit pixel block 4 in the present embodiment has the shape of a cross, which is composed of five pixels. As shown in FIG. 10B, adjoining unit pixel blocks are placed in close proximity. As a result, the center of the unit pixel block 4 is close to, and distant by only one pixel from, the centers of adjoining unit pixel blocks along the horizontal and vertical directions. When the unit pixel block 4 is shaped in a rectangle of 2×2 pixels as in Embodiment 1, the interval between the centers of adjoining regions is 2 pixels. Therefore, the interval between centers is one pixel closer according to the present embodiment. As a result, as compared to the image capture device of Embodiment 1, the image capture device of the present embodiment can have an improved resolution along the horizontal and vertical directions. In other words, a motion video that is generated by the image capture device of the present embodiment, in which cross-shaped unit pixel blocks are adopted, will have an improved resolution than that of a motion video that is generated by the image capture device of Embodiment 1, in which rectangular unit pixel blocks are adopted.

Thus, according to the present embodiment, because each unit pixel block contains five pixels that are placed in a cross shape, the centers of unit pixel blocks being close to one another, there is provided an effect of improving the resolution of motion video.

Although the number in each unit pixel block is five in the present embodiment, the number of pixels contained therein does not need to be five, and may be greater than six, so long as the shape of the terrain of each unit pixel block is a cross.

INDUSTRIAL APPLICABILITY

The solid-state image sensor and image capture device according to the present invention are effective for all cameras in which solid-state image sensors are used. For example, they can be used in cameras for consumer use such as digital still cameras and digital camcorders, solid-state monitor cameras for industrial use, and so on.

REFERENCE SIGNS LIST 1 unit pixel block consisting of four pixels (P(i,1), P(i+1,1), P(i+2,1), P(i+3,1)) at upper left end of image
2 one frame of image
3 one frame of image
4 cross-shaped unit pixel block consisting of five pixels
5 converging lens
6 optical plate
7 solid-state image sensor
8 signal generation and pixel signal reception section
9 sensor driving section
10 video signal processing section
11 image memory section
12 video signal generating section
13 video interface section
20 pixel
30 pixel signal reading section
32 image generating section
40 unit pixel block
50a, 50b, 50c, 50d read signal line
52a, 52b output signal line
100 imaging section
200 pixel array

The invention claimed is:
1. An image capture device comprising:
an array of pixels including a plurality of pixels which are arranged two-dimensionally on an imaging area, the array of pixels being divided into M unit pixel blocks (where M is an integer of 2 or more) each containing N pixels (where N is an integer of 2 or more);
a pixel signal reading section for reading a pixel signal from each pixel at a constant time interval T, and reading the pixel signals from the N pixels contained in each unit pixel block with respectively different timings; and
an image generating section for generating an image of M pixels, each of the M pixels having a pixel value that is a representative pixel value of a corresponding unit pixel block, the representative pixel value being calculated using the pixel signals of the N pixels common to a respective unit pixel block having been read by the pixel signal reading section.

2. The image capture device of claim 1, wherein the pixel signal reading section reads the pixel signals from the N pixels contained in each unit pixel block with timings which respectively differ by a time T/N.

3. The image capture device of claim 2, wherein the image generating section generates the image based on the M×N pixel signals which are read by the pixel signal reading section during the time interval T.

4. The image capture device of claim 3, wherein,
given a pixel signal P(i,j) which is read by the pixel signal reading section from a $j^{th}$ unit pixel block (where j is an integer of no less than 1 and no more than M) at an $i^{th}$ readout (where i is an integer of N+1 or more),
when an absolute value of a difference between P(i,j) and P(i−1,j) is greater than a predetermined value, the image generating section generates the image by adopting P(i,j)−P(i−N+1,j)×(N−1)/N as a signal representing the pixel value of each pixel in the $j^{th}$ unit pixel block at the $i^{th}$ readout.

5. The image capture device of claim 4, wherein, when an absolute value of a difference between P(i,j) and P(i−1,j) is greater than a predetermined value, the image generating section generates the image by adopting P(i+k,j)−P(i+k−1,j)+(k×P(i+k−N,j)−(k−1)×P(i+k−N−1,j))/N (where k is an integer of 1 or more but less than N) as a signal representing the pixel value of each pixel in the $j^{th}$ unit pixel block at an i+$k^{th}$ readout.

6. The image capture device of claim 1, wherein the pixel signal reading section varies the time interval T according to a brightness of a subject.

7. The image capture device of claim 1, wherein the shape of a terrain of each unit pixel block is a cross.

8. The image capture device of claim 1, comprising an optical low-pass filter for removing from the image a frequency component higher than a spatial frequency which is defined by the size of the unit pixel block.

9. The image capture device of claim 1, wherein the image generating section performs a low-pass filter process of removing from the image a frequency component higher than a spatial frequency which is defined by the size of the unit pixel block.

10. A solid-state image sensor comprising:
an array of pixels including a plurality of pixels which are arranged two-dimensionally on an imaging area, the array of pixels being divided into M unit pixel blocks (where M is an integer of 2 or more) each containing N pixels (where N is an integer of 2 or more); and
a pixel signal reading section for reading a pixel signal from each pixel at a constant time interval T, and reading the pixel signals from the N pixels contained in each unit pixel block with respectively different timings, and wherein the pixel signal reading section reads the pixel signals from the N pixels contained in each unit pixel block with timings which respectively differ by a time T/N.

11. A motion video generation method for generating a motion video based on a signal acquired by an image capture device having: an array of pixels including a plurality of pixels which are arranged two-dimensionally on an imaging area, the array of pixels being divided into M unit pixel blocks (where M is an integer of 2 or more) each containing N pixels (where N is an integer of 2 or more); and a pixel signal reading section for reading a pixel signal from each pixel at a constant time interval T, and reading the pixel signals from the N pixels contained in each unit pixel block with respectively different timings, the method comprising:

a step of determining whether a difference between two consecutively-read pixel signals in each unit pixel block is greater than a predefined value or not; and a step of, when the difference is greater than the predefined value, generating a first motion video with a relatively low resolution and a relatively high frame rate, the first motion video including images each having M pixels, each pixel having a pixel value that is a representative pixel value of a corresponding unit block, the representative pixel value being calculated using the pixel signals of the N pixels common to a respective unit pixel block, and when the difference is smaller than the predefined value, generating a second motion video with a relatively high resolution and a relatively low frame rate.

12. A non-transitory computer readable medium storing a motion video generation program for generating a motion video based on a signal acquired by an image capture device having: an array of pixels including a plurality of pixels which are arranged two-dimensionally on an imaging area, the array of pixels being divided into M unit pixel blocks (where M is an integer of 2 or more) each containing N pixels (where N is an integer of 2 or more); and a pixel signal reading section for reading a pixel signal from each pixel at a constant time interval T, and reading the pixel signals from the N pixels contained in each unit pixel block with respectively different timings, the program comprising:

a step of determining whether a difference between two consecutively-read pixel signals in each unit pixel block is greater than a predefined value or not; and a step of, when the difference is greater than the predefined value, generating a first motion video with a relatively low resolution and a relatively high frame rate, the first motion video including images each having M pixels, each pixel having a pixel value that is a representative pixel value of a corresponding unit block, the representative pixel value being calculated using the pixel signals of the N pixels common to a respective unit pixel block, and when the difference is smaller than the predefined value, generating a second motion video with a relatively high resolution and a relatively low frame rate.

* * * * *